(12) United States Patent
Lu et al.

(10) Patent No.: US 8,117,575 B2
(45) Date of Patent: Feb. 14, 2012

(54) SYSTEM AND METHOD FOR ON-CHIP-VARIATION ANALYSIS

(75) Inventors: Lee-Chung Lu, Taipei (TW); Chung-Hsing Wang, Baoshan Township (TW); Yuan-Te Hou, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 295 days.

(21) Appl. No.: 12/538,507

(22) Filed: Aug. 10, 2009

(65) Prior Publication Data
US 2011/0035715 A1 Feb. 10, 2011

(51) Int. Cl.
*G06F 17/50* (2006.01)
(52) U.S. Cl. ........................... 716/106; 716/108
(58) Field of Classification Search ........... 716/106–108
See application file for complete search history.

(56) References Cited

U.S. PATENT DOCUMENTS

| | | | |
|---|---|---|---|
| 7,117,457 B2 * | 10/2006 | Frenkil | 716/113 |
| 7,222,319 B2 | 5/2007 | Yonezawa | |
| 7,444,608 B2 | 10/2008 | Foreman et al. | |
| 7,526,399 B2 | 4/2009 | Matsumoto et al. | |
| 7,984,406 B2 * | 7/2011 | Akamine et al. | 716/115 |
| 2005/0050499 A1 | 3/2005 | Matsumoto et al. | |
| 2005/0081171 A1 | 4/2005 | Kawano et al. | |

FOREIGN PATENT DOCUMENTS

JP 2000-040098 A 2/2000

* cited by examiner

*Primary Examiner* — Jack Chiang
*Assistant Examiner* — Binh Tat
(74) *Attorney, Agent, or Firm* — Duane Morris LLP

(57) ABSTRACT

Apparatus is provided for performing timing analysis on a circuit. A first storage device portion stores a state dependent stage weight for each of a rising time arc and a falling time arc of each of a plurality of cells in a cell library. An adder is provided for calculating a sum of the state dependent stage weights for each of the cells that are included in a circuit path. A second storage device portion stores a table containing on chip variation (OCV) derating factors. The table is indexed by values of the sum. A total path delay is calculated for the circuit path, based on the OCV derating factor corresponding to the sum of the state dependent stage weights for the cells in the circuit path.

20 Claims, 6 Drawing Sheets

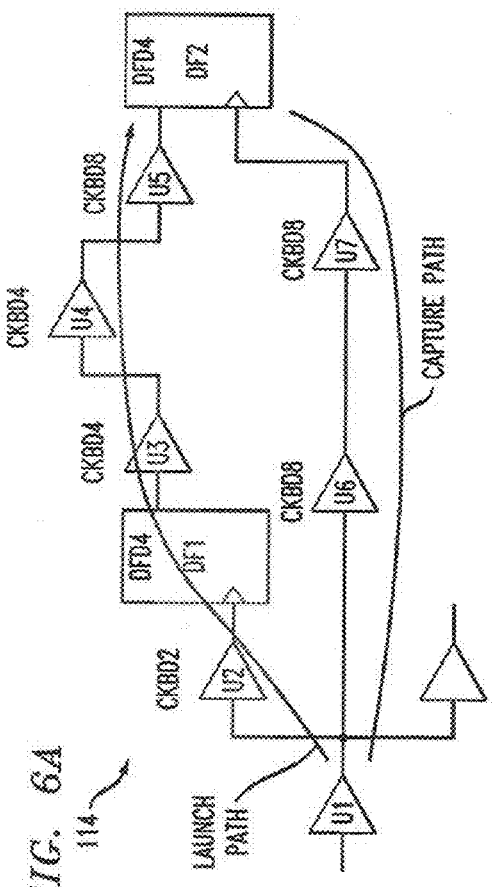

SYSTEM AND METHOD FOR ON-CHIP-VARIATION ANALYSIS

FIELD OF THE INVENTION

The present invention relates to systems and tools for integrated circuit (IC) timing analysis.

BACKGROUND

OCV (On-Chip Variation) analysis methodology has been used to cover the process variation effect on timing analysis in the IC design implementation stage. Any circuit design is assigned one or more timing specifications. Because the switching time for a transistor depends on the actual length and width of its channel, process variations that affect the gate dimensions also affect timing. To ensure that an IC can meet its performance specifications in the presence of process variations, on-chip variation (OCV) analysis has been used to include timing margin in the design. A typical OCV analysis assumed that process variations caused the channel length of each transistor to assume its worst case value. As a result, a large margin was included in the time budget of the circuit, to accommodate the variations.

This worst-case OCV analysis has an accuracy issue, because the probability of every device having its worst case maximum time is not very high. Also, in a cell having a large number of devices, some of the variations cancel each other out. Thus, assuming that every device has its worst case maximum delay value may cause difficulty in meeting the design performance and schedule requirements, due to overly inaccurate and pessimistic timing analysis.

Stage-Based OCV analysis attempts to resolve the inaccuracy issue of traditional OCV methodology. U.S. Patent Application Publication No. 2005/0081171 is incorporated by reference herein. This publication describes a method in which the number of gate stages of a circuit path are determined. As the number of stages increases, the OCV delay becomes a smaller fraction of the total path delay. A derating factor is determined as a function of the number of gate stages. The time budget for the circuit path is then reduced to account for the derating factor.

The stage based OCV method still provides a pessimistic margin, making it difficult to achieve design performance and schedule requirements.

SUMMARY OF THE INVENTION

In some embodiments, apparatus is provided for performing timing analysis on a circuit. A first storage device portion stores a state dependent stage weight for each of a rising time arc and a falling time arc of each of a plurality of cells in a cell library. An adder is provided for calculating a sum of the state dependent stage weights for each of the cells that are included in a circuit path. A second storage device portion stores a table containing on chip variation (OCV) derating factors, the table being indexed by values of the sum. Means are provided for calculating a total path delay for the circuit path, based on the OCV derating factor corresponding to the sum of the state dependent stage weights for the cells in the circuit path.

In some embodiments, a computer readable storage medium is encoded with computer program code, such that when the computer program code is executed by a processor, the processor performs a method, comprising calculating a state dependent stage weight for each of a rising time arc and a falling time arc of each of a plurality of cells in a cell library. A sum of the state dependent stage weights for each of the cells that are included in a circuit path is calculated. An OCV derating factor corresponding to the sum of the state dependent stage weights for the cells in the circuit path is retrieved from a table containing on chip variation (OCV) derating factors. The table is indexed by values of the sum of the state dependent stage weights. A total path delay is calculated for the circuit path, based on the retrieved OCV derating factor.

In some embodiments, a method comprises providing a storage device storing a state dependent stage weight for each of a rising time arc and a falling time arc of a each of a plurality of cells in a cell library. A sum of the state dependent stage weights is calculated for each of the cells that are included in a circuit path. an OCV derating factor corresponding to the sum of the state dependent stage weights for the cells in the circuit path is retrieved from a table containing on chip variation (OCV) derating factors. The table is indexed by values of the sum of the state dependent stage weights. A total path delay is calculated for the circuit path, based on the retrieved OCV derating factor. A design of the circuit path is determined, that satisfies timing requirements, based on the calculated total path delay. A tapeout of the design is performed to form a computer readable storage medium encoded with data usable for controlling a semiconductor process to fabricate an integrated circuit containing the circuit path.

BRIEF DESCRIPTION OF THE DRAWINGS

FIGS. 6A and 6B show an example of a cell design and state dependent stage weights for each device type in the cell design.

FIG. 6C shows the unified stage derating table of FIG. 1, which is usable for all cells in the cell library including the cell shown in FIG. 6A.

DETAILED DESCRIPTION

This description of the exemplary embodiments is intended to be read in connection with the accompanying drawings, which are to be considered part of the entire written description.

Figure 1:
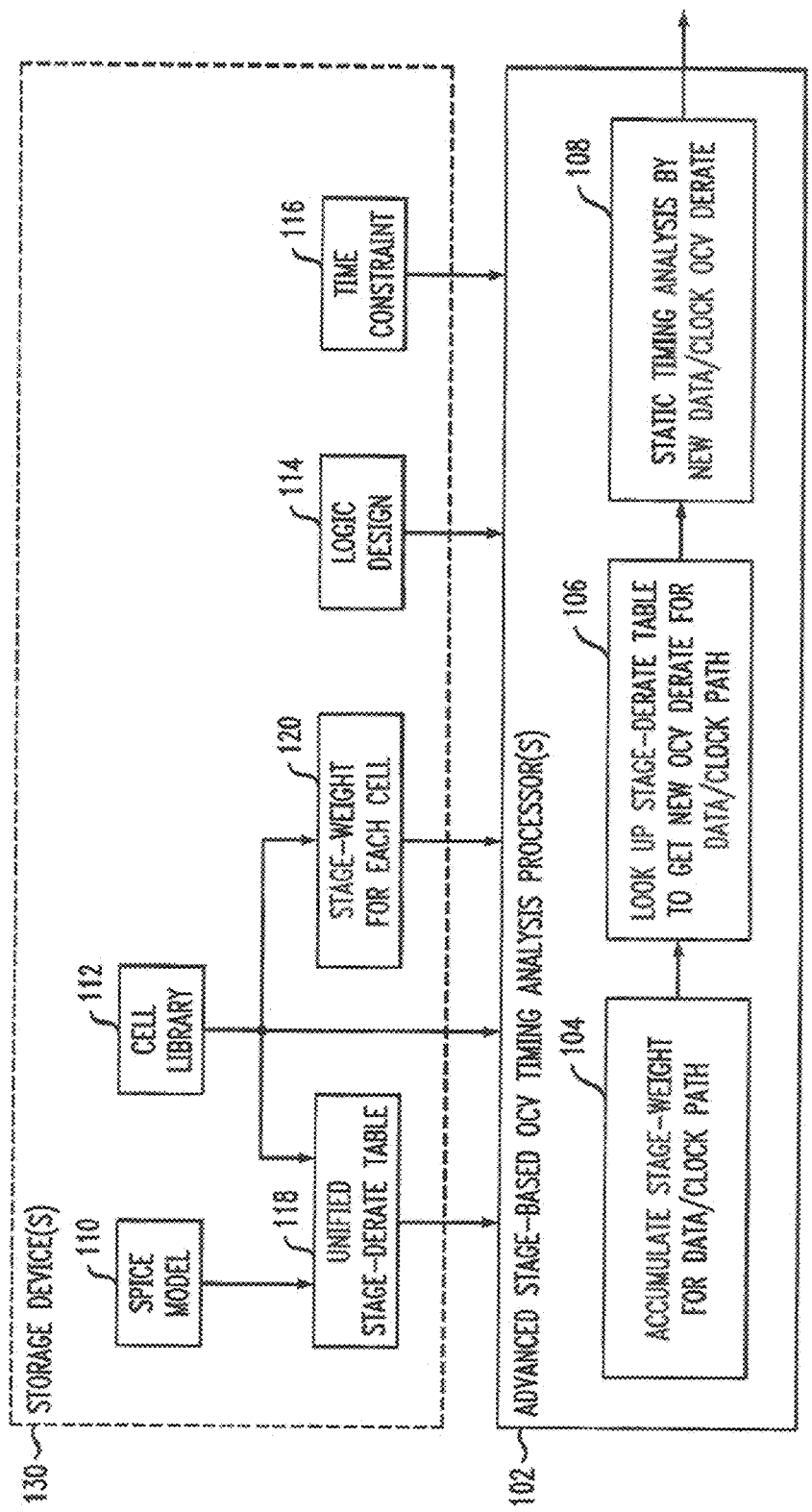
FIG. 1 is a block diagram of a system for performing OCV analysis

FIG. 1 is a block diagram of an exemplary timing analysis system 100, using state dependent stage weights.

The system includes tangible machine readable data storage devices 130 and processing circuitry 102. The data storage devices may include any combination of media, such as registers, random access memory (RAM), hard disk drives (HDD), read only memories (ROMs), CD-ROMs, DVD-ROMs, BD-ROMs, hard disk drives, flash memories, or any other machine-readable storage medium. In some embodiments, the processing circuitry 102 includes a programmed general purpose computer. In other embodiments, the processing circuitry 102 includes application specific integrated circuits (ASIC). In still other embodiments, the processing circuitry includes a combination of a general purpose computer and one or more logic circuits implemented in ASIC.

The data elements include a cell library 112, which contains definitions of individual cells, the building blocks of IC designs. The cell definitions may be provided in a standard format, such as GDS II or OASIS. Additional data (e.g., a SPICE model 110) are provided, characterizing the performance of the active devices (e.g., transistors) in the cell library 112 based on gate level analysis of the physical dimensions of the devices.

The logic design 114 specifies the configuration of basic library cells that are combined together to form the IC design, and may be in the form of a net list. A set 116 of timing constraints is provided, specifying the performance of each of the IC circuit paths. These timing constraints define the total delay permitted for each path, within which the signal propagation delay plus any delay due to on-chip variation must be accounted for.

A single unified stage-derating factor table 118 is provided, for use with all logic designs using the cell library 112. An example of a stage derating factor table 118 is shown in FIG. 6C. The table 118 is indexed by an input corresponding to the sum of normalized state dependent stage weights for each cell in a given circuit path in the design (explained below). The output of the stage derating factor table 118 is a derating factor that can be applied to the delay specification for any circuit having the corresponding sum of state dependent stage weights. If the sum of the state dependent stage weights for a given circuit lies in between two adjacent entries in the derating factor table 118, then an interpolation is performed between the derating factors for the two adjacent entries of the table.

The state dependent stage weight table 120 contains stage weights for each cell. The stage weights are not limited to the value "1", and are not limited to integers. The stage weight for a given cell includes a respective component for each rising and falling arc of each circuit path in the cell. Each component is the mean delay for a particular path in a particular state, and is normalized by dividing the delay by the delay of a reference cell. In some embodiments, the state dependent stage weights for each cell in a given cell library are only computed once and stored in table 120 in a storage device, for subsequent use in accessing the derate factor table 118.

Instead of indexing the table 118 based on an integer value representing the number of stages, the table 118 is indexed based on a measure of the actual delay in each respective state. One reason for determining separate delay components for rising and falling states is that a PMOS transistor is relatively larger than an NMOS transistor. The signal delay depends on the channel size, and the PMOS delay is about 1.15 times the NMOS delay. Thus, a given cell is assigned a stage weight, which may be a non-integer value.

For example, in a cell having four outputs (paths), with each output having a respective rising state and a respective falling state, the state dependent stage weight is the sum of eight components, each corresponding to a mean output signal delay for the rising or falling state of one of the four outputs. For use in the stage weight calculation, these eight delay components are normalized and expressed as a ratio of the delay for a given path/state divided by the delay of the reference device. In some embodiments, the reference device is the device having the smallest number of gates (such as an inverter). Thus, the state dependent stage weight takes into account the number of stages, as well as the number of separate paths in the cell and the number of states.

The stage weights for each cell of the cell library 112 may be stored in a separate file or table 120 that only contains the stage weight data. In other embodiments, the sum of normalized stage weights for each cell is stored in a data file associated with the cell library, along with other information relating to each respective cell. In other embodiments, a database may store information about each cell, including the sum of the normalized stage weights and an OCV derating factor for that cell.

The unified OCV stage derating table 118 may be generated using a reference cell having a large number of stages, greater than or equal to the largest number of stages expected in any circuit path. For example, a Monte Carlo simulation may be performed at the transistor level to determine the mean delay and variation at each of 100 stages of the reference cell, taking into account process variation parameters. In some embodiments, the simulation is performed with 1000 iterations for each stage. One of ordinary skill can readily select a reference cell design for a given cell library, and select suitable parameters for the Monte Carlo simulation. At each respective stage N of the reference circuit, the ratio of the 3-sigma delay to the mean is used as the derating factor in table 118 corresponding to a circuit path having that number N of stages. Using a single, unified OCV stage derating table in this manner, it is not necessary to individually perform numerically intensive cell-level derating factor computations for every cell.

When performing timing analysis for a given circuit path or cell, the derating factor for the circuit path is obtained by accessing the stage-Berate factor table 118 using the stun of state dependent stage weights for all the cells in that circuit path as the index (input) value. The table 120 provides the individual stage weight values corresponding to each cell in the circuit. These individual stage weights are summed together to yield the index value that is used when accessing the stage derate table 118. Within a given circuit design, the sum of state dependent stage weights includes a respective state dependent stage weight for each cell.

Also shown in FIG. 1 are three functions that use the outputs of the unified stage-derate table. In some embodiments, the processing functions 104, 106 and 108 are integrated into an electronic design automation (EDA) tool. In other embodiments, these functions 104, 106, 108 may be executed by one or more programmed processors executing one or more independent computer programs, which cooperate with the EDA tools, either providing inputs to the EDA tool or receiving inputs from the EDA tool.

Referring again to FIG. 1, the Accumulate stage-weight for data/clock path function 104 calculates the input value used to access derate table 118, based on the stage weight data in table 120, as discussed above.

The look-up function 106 identifies each cell of the design, and performs a table look up in table 118 to obtain the derate factor for the circuit. The sum of the stage weights output by the function 104 is used as in input value to access the unified stage derate table 118, using interpolation if the sum of the stage weights lies in between two adjacent index values in the stage derate table 118.

The static timing analysis function 108 performs a timing analysis using any suitable circuit timing analysis algorithm, inputting the derating factors obtained from the unified stage derate table 118, indexed by the sum of the state dependent stage weights.

The inventors have discovered that the difference between the delays for different output states has a substantial impact on the total path delay, and that accounting for these differences in the stage weights permits more accurate OCV analysis and reduced time budget. margin allocations. The inventors have also discovered that indexing the OCV derating table 108 using the sum of stage weights provides a more accurate OCV analysis than indexing the table by conventional stage counts, and allows reduced time budget margin allocations.

For example, consider the circuit shown in FIG. 6A, the stage weight table 120 shown in FIG. 6B, and the derate table 118 shown in FIG. 6C. The reference cell CKBD2 has a stage weight of 1.0 (by definition), and the cell CKBD4 has a stage weight of 2.0. The other two cells CKBD8 and DFD4 have non-integer stage weights of 3.67 and 8.43, respectively. The stage weights for CKBD8 and DFD4 differ from the conventional methods in multiple respects. The conventional stage weight for all of these cells would be 1, respectively, because they do not include separate components for each state of each path. Second, the conventional stage counts would be integers representing the number of gate levels or cells (corresponding to every cell having a weight of 1.0), whereas the state dependent stage weight takes into account differences in delays for each state (rising and falling) of the output, which are due, for example, to size and delay differences between constituent PMOS and NMOS transistors in the rising and falling signal paths.

One of ordinary skill in the art will appreciate that the sum of the state dependent stage weights (summed over all of the cells in the circuit path) is generally a larger value than the conventional stage count, because the stage count does not add together separate components for each state (rising and falling). As shown in FIG. 6C, stage derating factors increase as the input (stage count or sum of the state dependent stage weights) increases. Thus, using the sum of the state dependent stage weights to index the stage derate table generally results in the output derating factor being higher than the derating factor that would be obtained by using a conventional stage count as an input to the derating factor table 118.

Continuing the same example, in FIGS. 6A-6C, the data launch path includes one CKBD2 cell, one DFD4 cell, two CDBD4 cells and one CDBD8 cell. Using the stage weights in FIG. 6B, the sum of the state dependent stage weights is 1.0+8.43+(2)(2.0)+3.67=17.1. In contrast, a conventional stage count measure for the same launch path would be 5. Reference to the derate factor table in FIG. 6C shows that the derating factors for 17.1 and 5 are 0.897 (interpolated) and 0.865, respectively. During the timing analysis, the application of the derating factor 0.897 instead of 0.865 provides a more realistic margin sufficient to meet timing requirements without placing an unrealistic and unnecessary burden on the design through excess timing margin. A similar result is obtained in the clock (capture) path, where the sum of the state dependent stage weights is (2)*(3.67)=7.34, but the conventional stage count is 2. The interpolated derating factors for 7.34 and 2 are 0.874 and 0.832, respectively. The use of a capture path derating factor of 0.847 provides a more accurate timing margin that does not overburden the circuit design.

Figure 2:
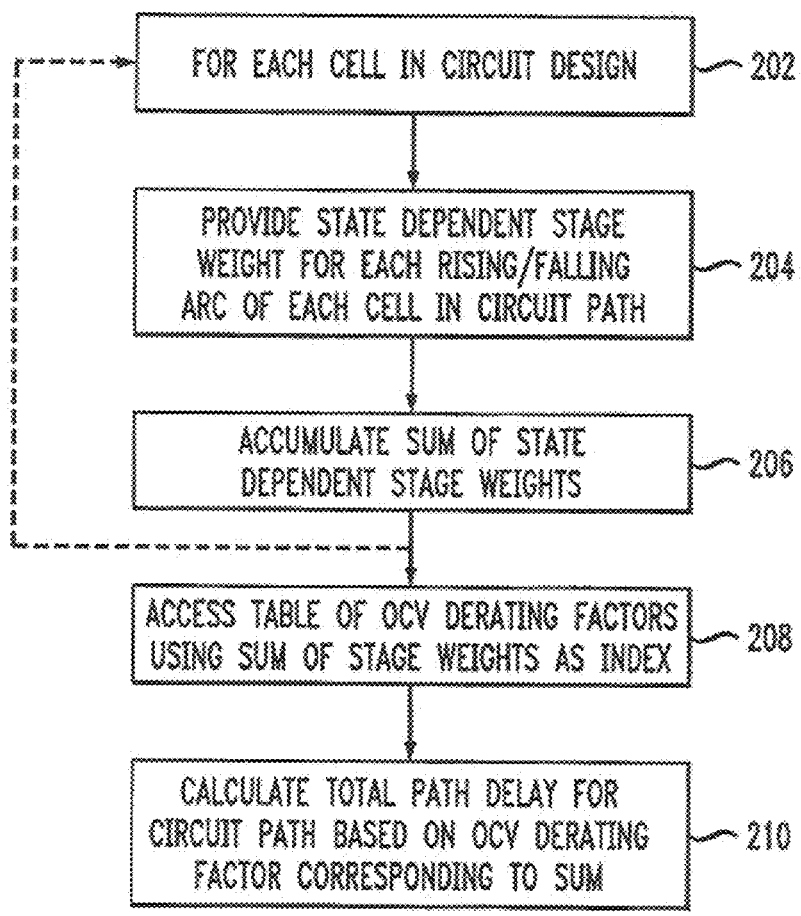
FIG. 2 is a flow chart of a method of OCV analysis using the system of FIG. 1.

FIG. 2 a flow chart of one embodiment of a method.

At step 202, a loop including steps 204 and 206 is executed for each cell in the cell library.

At step 204, the state dependent stage weight is provided (by block 104) for each cell in the circuit path. In some embodiments, the stage weights for each cell in the library are calculated only once and stored in the table 120, for rapid and convenient subsequent use, to reduce computation time. In other embodiments, the weights are calculated each time the stage derate table 118 is to be accessed.

At step 206, the individual cell stage weight components are accumulated to calculate the sum of the state dependent stage weights for the whole circuit path.

At step 208, the unified stage derate table 118 of OCV derating factors is accessed by block 106. The sum of the state dependent stage weights calculated at step 206 is used as the input to the stage derate table 118, and an OCV derating factor for the circuit path is output. An OCV derating factor corresponding to the sum of the state dependent stage weights for the circuit path is obtained.

At step 210, a total path delay for the circuit path is calculated by block 108, based on the retrieved OCV derating factor from step 208.

Figure 3:
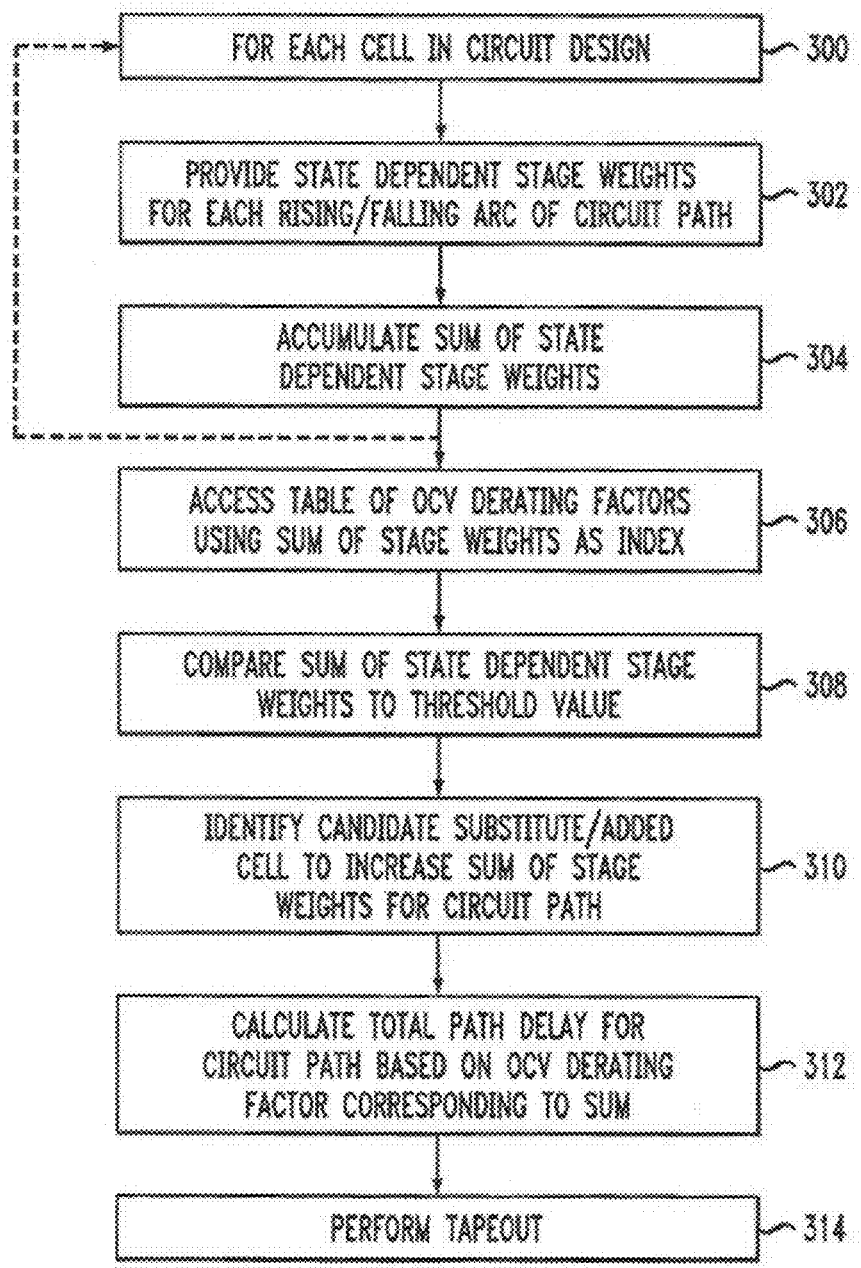
FIG. 3 is a more detailed flow chart of an example of the method of FIG. 2.

FIG. 3 is a more detailed diagram of a particular embodiment. The inventors have determined that an automated design improvement technique can use the sum of the state dependent stage weights as a quantitative measure of a level of optimization of a circuit design. As noted above, larger index values in table 118 correspond to larger (closer to 1.0) derating factors. If the sum of the state dependent stage weights is less than a minimum threshold value (e.g., 20.0), then the standard deviation of the circuit delay will be large relative to the mean delay. Thus, the method of FIG. 3 evaluates the stun of the state dependent stage weights, and if appropriate, modifies the design to reduce the ratio of the delay standard deviation to the mean delay (i.e., to increase the sum of the stage weights to a value beyond the threshold).

At step 300, a loop including steps 302 and 304 is executed for each cell in the cell library.

At step 302, the state dependent stage weight is provided (by block 104) for each cell in the circuit path, and the sum of these stage weights is accumulated for the circuit. In some embodiments, the stage weights for each cell in the library are calculated only once and stored in the table 120, for rapid and convenient subsequent use, to reduce computation time. The means for providing a state dependent stage weight for the rising time arc and falling time arc of a circuit path includes the table 120 and a computer programmed to access the previously stored stage weights in the table. In other embodiments, the weights are calculated each time the stage derate table 118 is to be accessed, and the calculating means is a programmed computer or ASIC implementing the algorithm shown in FIG. 5.

At step 304, the individual cell stage weight components are accumulated to calculate the sum of the state dependent stage weights for the whole circuit path. The adder may be implemented in a programmed computer or by hardware logic.

At step 306, the unified stage derate table 118 of OCV derating factors is accessed by block 106. The sum of the state dependent stage weights calculated at step 304 is used as the input to the stage derate table 118, and an OCV derating factor for the circuit path is output. An OCV derating factor corresponding to the sum of the state dependent stage weights for the circuit path is obtained.

Figure 4:
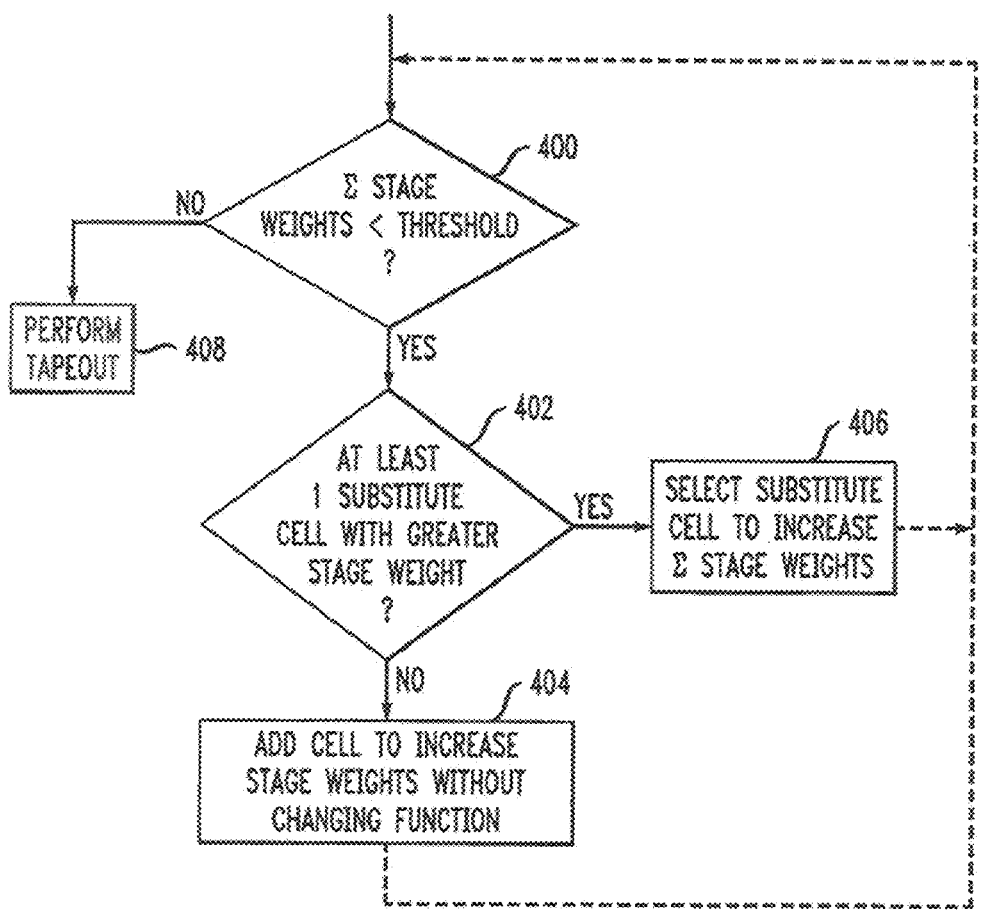
FIG. 4 is a flow chart of a design optimization method for use in the system of FIG. 1.

At step 308, the sum of the state dependent stage weights is compared to a minimum desired threshold value. The means for comparing the sum of the state dependent stage weights to a threshold value may be embodied in a computer program step as shown in FIG. 4, or may be implemented in ASIC.

At step 310, if the sum is less than the minimum threshold value, then one or more alternative cells are considered, either as substitutes for one or more cells of the design, or as additions to the design. A substitute cell would be chosen to perform the same function as one of the cells initially chosen for the design, but would have a larger state dependent stage weight, to increase the total delay of the cell and reduce the ratio of the delay standard deviation to the mean delay. For example, a substitute cell might have larger transistors and/or a larger number of transistors. An added cell would be selected to add delay to the cell without changing the function. For example, two inverters in series with each other would add delay to the circuit, but output the same signal state. Any substitution or addition is subject to the overall circuit satisfying timing requirements, based on the calculated total path delay, which is facilitated by the increased derating factor.

At step 312, the total path delay for the revised circuit design is calculated, based on a (now increased) OCV derating factor corresponding to the sum of the state dependent stage weights increased by the substitution/addition of step 310. The means for calculating a total path delay for the circuit path (based on the OCV derating factor corresponding to the sum of the state dependent stage weights for the circuit path) may be implemented in a programmed computer running an electronic design automation (EDA) system, such as those marketed by Synopsis, Inc. of Mountain View, Calif. or Cadence Design Systems, Inc. of San Jose, Calif.

At step 314, a tapeout of the design forms a computer readable storage medium encoded with data usable for controlling a semiconductor process to fabricate an integrated circuit containing the circuit path.

FIG. 4 shows a detail of the substitution/addition step 310.

At step 400, the sum of the state dependent stage weights is compared to the minimum threshold value. If the sum is less than the threshold, then step 402 is executed. If the sum is greater, then step 408 is executed next.

At step 402, a determination is made whether the cell library contains at least one cell that can perform the same function as a cell currently included in the circuit design, but has a greater stage weight. If there is at least one such cell, step 406 is performed. If there is no alternative cell in the library that performs the same function as a cell in the circuit design but has a larger sum of stage weights, then step 404 is performed.

At step 404, a cell is added to the circuit design to increase the sum of the stage weights without changing the circuit's function, such that the sum of the state dependent stage weights for the circuit path when the candidate substitute cell is included in the circuit is greater than when the original cell is included in the circuit path. Step 400 is performed next, repeating the loop until the sum of the stage weights reaches the minimum threshold.

At step 406, at least one substitute cell is identified to be included in the circuit path instead of at least one cell, such that the sum of the state dependent stage weights for the circuit path when the candidate substitute cell is included in the circuit is greater than when the at least one cell is included in the circuit path. If there are multiple substitute cells which increase the sum of the stage weights by at least the desired amount without changing circuit function, the system selects the candidate cell which causes the sum of the stage weights to exceed the threshold by the minimum amount (and thus provides a sum of the state dependent stage weights for the circuit path which is closest to the threshold value). This minimizes increase in total delay, and minimizes increase in IC area. If there are multiple substitute cells that increase the sum of the stage weights, but none increases the sum of the stage weights enough to meet the minimum threshold value, the identifying means is configured for selecting from among two or more candidate substitute cells, so as to maximize the sum of the state dependent stage weights for the circuit path. Step 400 is performed next, repeating the loop until the sum of the stage weights reaches the minimum threshold.

At step 408, a tapeout of the design is performed to form a computer readable storage medium encoded with data usable for controlling a semiconductor process to fabricate an integrated circuit containing the circuit path.

Figure 5:
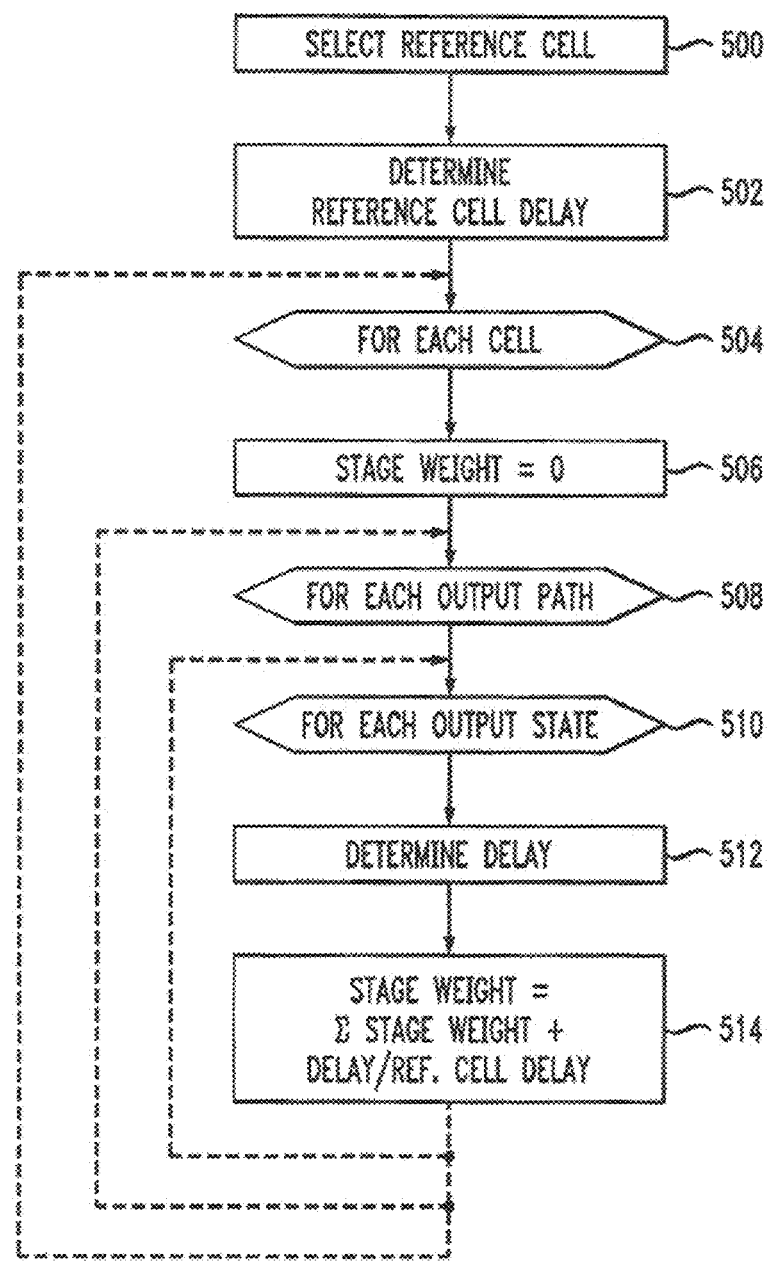
FIG. 5 is a flow chart of a method of constructing the derating factor table of FIG. 1.

FIG. 5 is a flow chart of the process for generating the table 120 of stage weights.

At step 500, a reference cell is selected. The reference cell may be the smallest cell in library, for example, an inverter cell.

At step 502, the delay for the reference cell is determined, based on gate level device characteristics. The delay may be determined by a SPICE model, or a monte carlo simulation, for example.

At step 504, a loop is performed for each cell in the cell library, including steps 506-514.

At step 506 an accumulator for the state dependent stage weight is initialized to zero.

At step 508, a loop is performed for each output path of the cell, including steps 510-514.

At step 510, an inner loop is performed for each output state, including steps 512-514.

At step 512, the delay of the path for the given state is determined.

At step 514, the delay is normalized and added to the accumulator for the sum of the stage weights for the cell. Normalization is achieved by dividing the delay for a path by the delay of the reference cell. Since each of the individual stage weights is normalized before addition, the total is normalized. Alternatively, the delays can be accumulated, and then the sum of the delays can be normalized by dividing the sum of the delays by the delay of the reference cell. The result is the same. The final accumulated sum of the stage weights for each path/state, of the cell is stored in the table 120.

The present invention may be at least partially embodied in the form of computer-implemented processes and apparatus for practicing those processes. The present invention may also be at least partially embodied in the form of computer program code embodied in tangible machine readable storage media, such as random access memory (RAM), read only memories (ROMs), CD-ROMs, DVD-ROMs, BD-ROMs, hard disk drives, flash memories, or any other machine-readable storage medium, wherein, when the computer program code is loaded into and executed by a computer, the computer becomes an apparatus for practicing the invention. The present invention may also be embodied at least partially in the form of computer program code, for example, whether stored in a storage medium, loaded into and/or executed by a computer, such that, when the computer program code is loaded into and executed by a computer, the computer becomes an apparatus for practicing the invention. When implemented on a general-purpose processor, the computer program code segments configure the processor to create specific logic circuits. The invention may alternatively be at least partially embodied in a digital signal processor formed of application specific integrated circuits for performing a method according to the principles of the invention.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. Apparatus for performing timing analysis on a circuit, comprising:
   a first storage device portion storing a state dependent stage weight for each of a rising time arc and a falling time arc of each of a plurality of cells in a cell library;
   an adder for calculating a sum of the state dependent stage weights for each of the cells that are included in a circuit path, the circuit path having up to N number of stages;

a second storage device portion that stores a table containing on chip variation (OCV) derating factors, the table being indexed by values of the sum; and means for calculating a total path delay for the circuit path, based on the OCV derating factor corresponding to the sum of the state dependent stage weights for the cells in the circuit path, wherein each of the OCV derating factor in the table also corresponds to an individual circuit path in a cell having up to N number of stages, a 3-sigma delay and a mean delay at each respective stage of the reference cell calculated by performing a statistical simulation at the reference cell's transistor level having determined a mean delay and variation at each of the N stages of the reference cell, taking into account process variation parameters, and the OCV derating factors being determined as the ratio of the 3-sigma delay to the mean delay at each respective stage up to N of a reference cell.

2. The apparatus of claim 1, wherein the circuit path includes at least one cell, the apparatus further comprising:
means for comparing the sum of the state dependent stage weights to a threshold value; and
means for identifying at least one candidate substitute cell to be included in the circuit path instead of the at least one cell, such that the sum of the state dependent stage weights for the circuit path when the candidate substitute cell is included in the circuit path is greater than when the at least one cell is included in the circuit path.

3. The apparatus of claim 2, wherein the identifying means is configured for selecting from among two or more candidate substitute cells, so as to maximize the sum of the state dependent stage weights for the circuit path.

4. The apparatus of claim 2, wherein the identifying means is configured for selecting from among two or more candidate substitute cells to select a candidate substitute cell that provides a sum of the state dependent stage weights for the circuit path which is closest to the threshold value.

5. The apparatus of claim 1, further comprising:
means for comparing the sum of the state dependent stage weights to a threshold value; and
means for adding at least one cell to the circuit path to increase the sum of the state dependent stage weights without changing a function performed by the circuit path.

6. The apparatus of claim 1, wherein the state dependent stage weights for each cell take into account a size of each transistor in the cell.

7. The apparatus of claim 1, wherein the apparatus has a single OCV derating factor table for use in determining total path delay for a plurality of circuits.

8. The apparatus of claim 1, wherein index values of the single OCV derating table are normalized, based on a delay of a reference cell included in the circuit path.

9. The apparatus of claim 1, wherein index values of the single OCV derating table are normalized, based on a delay of an inverter cell included in the circuit path.

10. A non-transitory computer readable storage medium encoded with computer program code, such that when the computer program code is executed by a processor, the processor performs a method, comprising the steps of:
calculating a state dependent stage weight for each of a rising time arc and a falling time arc of each of a plurality of cells in a cell library;
calculating a sum of the state dependent stage weights for each of the cells that are included in a circuit path;
retrieving, from a table containing on chip variation (OCV) derating factors, an OCV derating factor corresponding to the sum of the state dependent stage weights for the cells in the circuit path, wherein the table is indexed by values of the sum of the state dependent stage weights; and
calculating a total path delay for the circuit path, based on the retrieved OCV derating factor, wherein each of the OCV derating factor in the table also corresponds to an individual circuit path in a cell having up to N number of stages,
a 3-sigma delay and a mean delay at each respective stage of the reference cell calculated by performing a statistical simulation at the reference cell's transistor level having determined a mean delay and variation at each of the N stages of the reference cell, taking into account process variation parameters, and the OCV derating factors being determined as the ratio of the 3-sigma delay to the mean delay at each respective stage up to N of a reference cell.

11. The non-transitory computer readable storage medium of claim 10, wherein the medium is encoded with additional computer program code executable by the processor for:
determining a design of the circuit path that satisfies timing requirements, based on the calculated total path delay; and
performing a tapeout of the design to form a computer readable storage medium encoded with data usable for controlling a semiconductor process to fabricate an integrated circuit containing the circuit path.

12. The non-transitory computer readable storage medium of claim 10, wherein the circuit path includes at least one cell, and the medium is encoded with additional computer program code executable by the processor for:
comparing the sum of the state dependent stage weights to a threshold value; and
identifying at least one candidate substitute cell to be included in the circuit path instead of the at least one cell, such that the sum of the state dependent stage weights for the circuit path when the candidate substitute cell is included in the circuit is greater than when the at least one cell is included in the circuit path.

13. The non-transitory computer readable storage medium of claim 10, wherein the medium is encoded with additional computer program code executable by the processor for:
comparing the sum of the state dependent stage weights to a threshold value; and
adding at least one cell to the circuit path to increase the sum of the state dependent stage weights without changing a function performed by the circuit path.

14. The non-transitory computer readable storage medium of claim 10, wherein the state dependent stage weights for each cell take into account a size of each transistor in the cell.

15. The non-transitory computer readable storage medium of claim 10, a single OCV derating factor table is used in determining total path delay for a plurality of circuits.

16. A method, comprising the steps of:
(a) providing a storage device storing a state dependent stage weight for each of a rising time arc and a falling time arc of a each of a plurality of cells in a cell library;
(b) calculating a sum of the state dependent stage weights for each of the cells that are included in a circuit path by using a computer;
(c) retrieving, from a table containing on chip variation (OCV) derating factors, an OCV derating factor corresponding to the sum of the state dependent stage weights for the cells in the circuit path, wherein the table is indexed by values of the sum of the state dependent stage weights by using the computer;

(d) calculating a total path delay for the circuit path, based on the retrieved OCV derating factor by using the computer;

(e) determining a design of the circuit path that satisfies timing requirements, based on the calculated total path delay by using the computer; and (f) performing a tapeout of the design to form a computer readable storage medium encoded with data usable for controlling a semiconductor process to fabricate an integrated circuit containing the circuit path, wherein each of the OCV derating factor in the table also corresponds to an individual circuit path in a cell having up to N number of stages, a 3-sigma delay and a mean delay at each respective stage of the reference cell calculated by performing a statistical simulation at the reference cell's transistor level having determined a mean delay and variation at each of the N stages of the reference cell, taking into account process variation parameters, and the OCV derating factors being determined as the ratio of the 3-sigma delay to the mean delay at each respective stage up to N of a reference cell.

17. The method of claim 16, wherein the circuit path includes at least one cell, the method further comprising:

comparing the sum of the state dependent stage weights to a threshold value by using the computer; and identifying at least one candidate substitute cell to be included in the circuit path instead of the at least one cell, such that the sum of the state dependent stage weights for the circuit path when the candidate substitute cell is included in the circuit is greater than when the at least one cell is included in the circuit path by using the computer.

18. The method of claim 16, further comprising:

comparing the sum of the state dependent stage weights to a threshold value by using the computer; and adding at least one cell to the circuit path to increase the sum of the state dependent stage weights without changing a function performed by the circuit path by using the computer.

19. The method of claim 16, wherein the state dependent stage weights for the circuit path take into account a size of each transistor in the circuit path.

20. The method of claim 16, further comprising:

using a single OCV derating factor table in determining total path delay for a plurality of circuits.

\* \* \* \* \*